(12) United States Patent
Ogata et al.

(10) Patent No.: US 11,327,579 B2
(45) Date of Patent: May 10, 2022

(54) ELECTRONIC PEN AND ELECTRONIC PEN MAIN BODY UNIT

(71) Applicant: Wacom Co., Ltd., Saitama (JP)

(72) Inventors: Mamoru Ogata, Saitama (JP); Kenichi Ninomiya, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/994,132

(22) Filed: Aug. 14, 2020

(65) Prior Publication Data

US 2021/0055807 A1 Feb. 25, 2021

(30) Foreign Application Priority Data

Aug. 22, 2019 (JP) ............................. JP2019-151644

(51) Int. Cl.
*G06F 3/0354* (2013.01)

(52) U.S. Cl.
CPC ............................. *G06F 3/03545* (2013.01)

(58) Field of Classification Search
CPC ....................... G06F 3/03545; G06F 3/0354
See application file for complete search history.

(56) References Cited

U.S. PATENT DOCUMENTS

| | | | | |
|---|---|---|---|---|
| 5,717,435 A * | 2/1998 | Fukushima | ......... | G06F 3/03545 345/179 |
| 6,062,756 A * | 5/2000 | Sasaki | ................... | B43K 24/08 401/111 |
| 9,626,011 B2 * | 4/2017 | Chang | ................. | G06F 3/03545 |
| 9,785,259 B2 * | 10/2017 | Cueto | ................. | G06F 3/03545 |
| 10,698,602 B2 * | 6/2020 | Kuo | ....................... | G06F 3/0383 |
| 10,761,620 B2 * | 9/2020 | Kaneda | ................... | B43K 29/08 |
| 2009/0135149 A1 * | 5/2009 | Taniuchi | ............. | G06F 3/03545 345/173 |
| 2011/0169756 A1 * | 7/2011 | Ogawa | .................. | G06F 3/0442 345/173 |
| 2014/0029182 A1 * | 1/2014 | Ashcraft | ............. | G06F 3/03545 361/679.4 |
| 2014/0218338 A1 * | 8/2014 | Kim | ....................... | G06F 3/041 345/174 |
| 2014/0333588 A1 * | 11/2014 | Lo | ....................... | G06F 3/03545 345/179 |
| 2017/0357340 A1 | 12/2017 | Kamiyama et al. | | |
| 2018/0181223 A1 * | 6/2018 | Yamada | .................... | G06K 9/24 |
| 2018/0299977 A1 * | 10/2018 | Ogata | .................... | B43K 29/08 |
| 2019/0087024 A1 * | 3/2019 | Kim | .................... | G06F 3/04883 |
| 2021/0026463 A1 * | 1/2021 | Tobita | ................. | G06F 3/04883 |

FOREIGN PATENT DOCUMENTS

| | | |
|---|---|---|
| JP | 7-44304 A | 2/1995 |
| JP | 7-295722 A | 11/1995 |
| WO | 2016/143498 A1 | 9/2016 |
| WO | 2017/043214 A1 | 3/2017 |

* cited by examiner

*Primary Examiner* — Carolyn R Edwards
(74) *Attorney, Agent, or Firm* — Seed IP Law Group LLP

(57) ABSTRACT

An electronic pen includes a first casing, a second casing disposed within the first casing, and an electronic pen main body unit incorporating an electronic pen function disposed within the second casing, in which the electronic pen main body unit includes a side switch unit having an operating element exposed on a side surface of the second casing, and an operating opening portion is disposed in a side surface of the first casing, and the operating opening portion exposes the operating element exposed on the side surface of the second casing.

18 Claims, 5 Drawing Sheets

ELECTRONIC PEN AND ELECTRONIC PEN MAIN BODY UNIT

BACKGROUND

Technical Field

The present disclosure relates to an electronic pen that inputs information by indicating coordinates on a position detecting sensor, for example.

Background Art

A position input device (coordinate input device) that includes a position detecting sensor (coordinate detecting sensor) of an electromagnetic induction type or a capacitance type and receives an input of a coordinate position indicated by an electronic pen is used as an input device of an information processing device such as a personal computer. Incidentally, an example of the electromagnetic induction type coordinate detecting sensor is disclosed in Japanese Patent Laid-Open No. H07-044304 to be described below or the like, and an example of the capacitance type coordinate detecting sensor is disclosed in Japanese Patent Laid-Open No. H07-295722 to be described below or the like.

In recent years, the position detecting sensor has also been mounted in an advanced mobile telephone terminal referred to as a smart phone or the like or a portable information terminal referred to as a tablet personal computer (PC) or the like. The electronic pen is also used in a case of inputting information by indicating a coordinate position on these apparatuses. Thus, as the electronic pen has come into wide and common use, there has been a desire to make it possible to use the electronic pen with ease similar to that of a commercially available ballpoint pen or the like.

International Publication WO 2016/143498 to be described below discloses configuring an electronic pen of a thin type. International Publication WO 2016/143498 teaches an electronic pen main body unit that incorporates functions as an electronic pen and which is configured to be of a size and a shape similar to those of a refill of a ballpoint pen, for example. Further, International Publication WO 2017/043214 teaches what is generally called a side switch and allows usage thereof in a case where the electronic pen main body unit configured according to the teachings in International Publication WO 2016/143498, for example, is used in a state of being housed in an outer case (casing) of a ballpoint pen.

Thus, because the electronic pen main body unit incorporating the electronic pen functions can be used in a state of being mounted within the outer case of the ballpoint pen, it is possible to realize an electronic pen convenient to carry and providing usability not different from that of the ballpoint pen. In addition, when the functions as the electronic pen are not used, a core body of the electronic pen main body unit which core body is exposed from a tip end of the outer case can be housed within the outer case. It is therefore possible to properly protect the core body of the electronic pen main body unit having weak strength against an external load due to the thinning of the electronic pen main body unit. In addition, the usage of the side switch is also made possible by using the technology disclosed in International Publication WO 2017/043214 described above. There is thus a great advantage of using the electronic pen main body unit incorporating the functions of the electronic pen and reduced in thickness.

International Publication WO 2017/043214 teaches a configuration in which a connection between electric contacts provided to the electronic pen main body unit is established by operating an operating element provided to the outer case. Therefore, in the case of an electronic pen having a configuration in which a pen tip is moved in and out from a front end of the outer case as in a knock type ballpoint pen, there is a possibility of occurrence of positional displacement between the operating element provided to the outer case and the contacts provided to the electronic pen main body unit due to some sort of cause. In this case, there is a possibility that the connection between the contacts may become unstable. Accordingly, there is a desire to realize a side switch that can be operated more stably in the case of using the thinned electronic pen main body unit.

SUMMARY

In view of the above, it is an object of the present disclosure to be able to make a side switch function more stably without diminishing advantages of a thinned electronic pen main body unit in a case of using the thinned electronic pen main body unit.

In order to solve the above problems, there is provided an electronic pen including a first casing, a second casing disposed within the first casing, and an electronic pen main body unit incorporating an electronic pen function, in which the electronic pen main body unit includes a side switch unit having an operating element exposed on a side surface of the second casing, and an operating opening portion is disposed in a side surface of the first casing, and the operating opening portion exposes the operating element exposed on the side surface of the second casing.

According to this electronic pen, the electronic pen is formed by mounting the electronic pen main body unit incorporating an electronic pen function, within the first casing. The second casing as the casing of the electronic pen main body unit is provided with the side switch unit having the operating element exposed on the side surface of the second casing. The operating element is made directly operable via the operating opening portion disposed in the first casing. A side switch in the case where the thinned electronic pen main body unit is used can thereby be made to function stably.

DETAILED DESCRIPTION

Figure 1A:
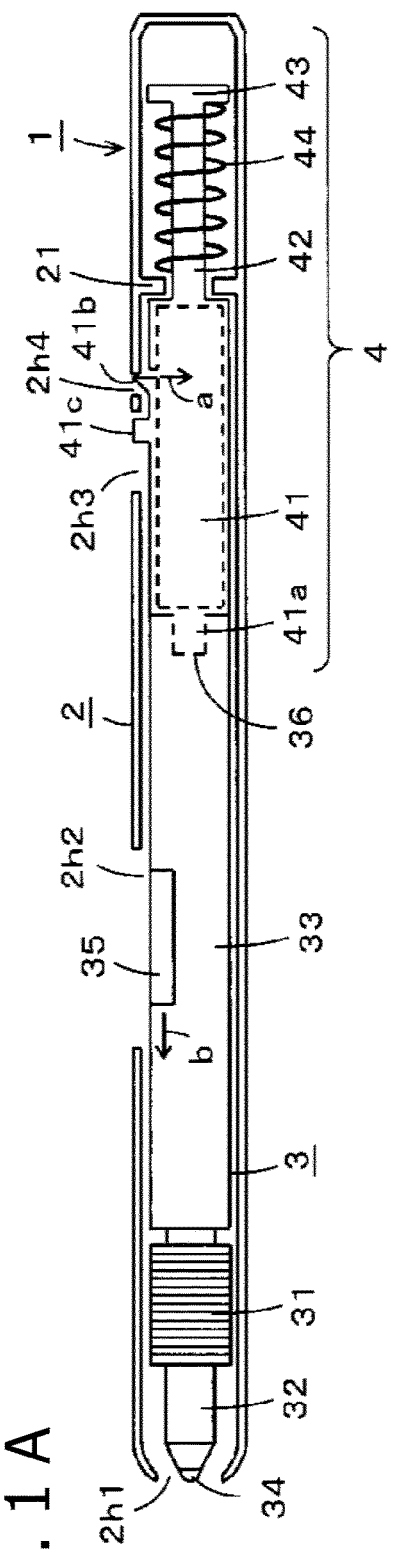
FIGS. 1A, 1B, and 1C are diagrams of assistance in explaining an example of a configuration of an electronic pen according to an embodiment.
Figure 1B:
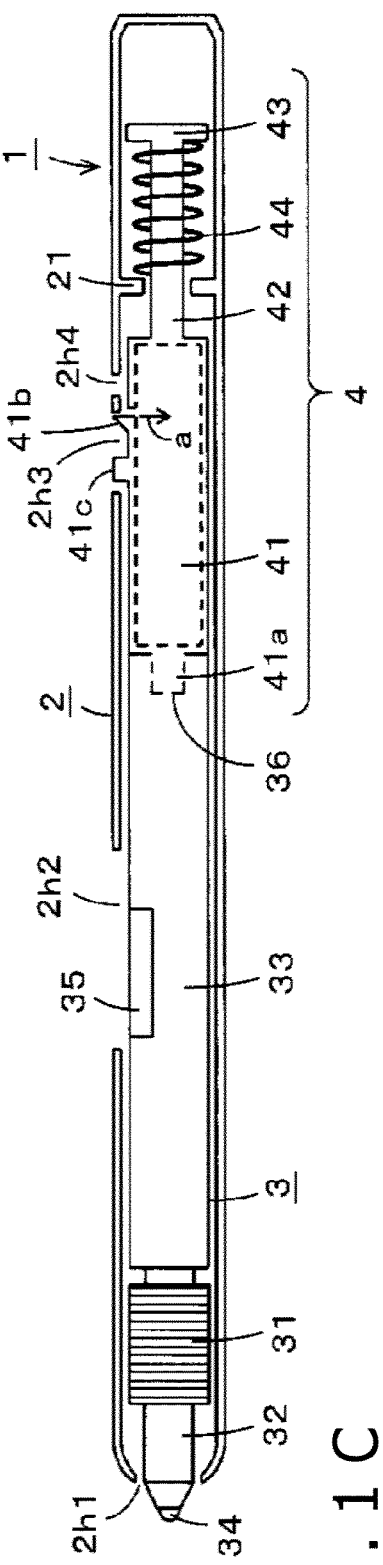
Figure 1C:
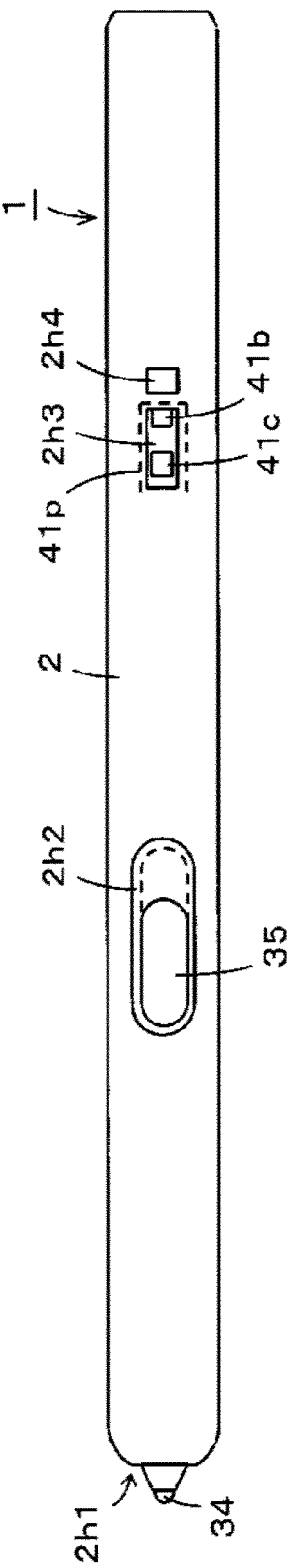

An embodiment of an electronic pen and an electronic pen main body unit according to the present disclosure will hereinafter be described with reference to the drawings. An electronic pen 1 according to the present embodiment is formed by inserting (loading) the electronic pen main body unit 3 incorporating an electromagnetic induction type electronic pen function into a first casing (outside casing) 2. FIGS. 1A to 1C are diagrams of assistance in explaining an example of a configuration of the electronic pen 1. Of FIGS. 1A to 1C, FIGS. 1A and 1B are views obtained by sectioning the first casing 2 in half along a longitudinal direction and removing a front side part of the first casing 2 to make an internal configuration visible. FIG. 1C is an external view of the electronic pen 1.

As illustrated in FIGS. 1A, 1B, and 1C, the first casing 2 is formed in a tubular shape. A front end portion as a pen tip side of the first casing 2 is an end portion opening portion 2h1. A rear end portion on a side opposite the first casing 2 is closed. A side surface of the first casing 2 is provided with three opening portions 2h2, 2h3, and 2h4. In addition, an inner wall surface on a rear end side of the first casing 2 is provided with a projecting portion 21 that projects in a ring shape in a direction of a central axis.

Figure 2A:
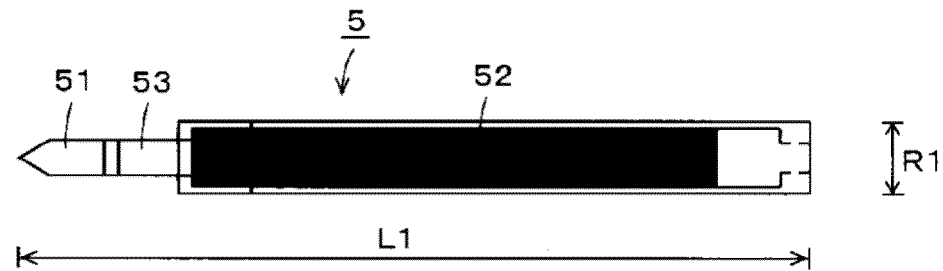
FIGS. 2A and 2B are diagrams of assistance in explaining an external appearance of an electronic pen main body unit according to the embodiment.
Figure 2B:
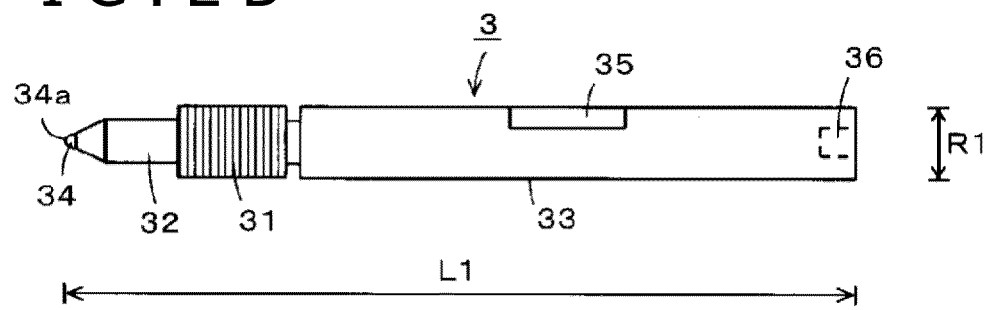

FIGS. 2A and 2B are views of assistance in explaining an external appearance of the electronic pen main body unit 3 in the embodiment and are views illustrated for comparison with a refill of a commercially available knock type ballpoint pen. Specifically, FIG. 2A illustrates a refill 5 of a commercially available ballpoint pen, and FIG. 2B illustrates an example of a configuration of the electronic pen main body unit 3 in the present embodiment. As illustrated in FIG. 2A, the refill 5 of the commercially available ballpoint pen has a well-known configuration formed by coupling and integrating a pen tip portion 51 having a ball disposed at a tip end thereof and an ink housing portion 52 with each other by a coupling portion 53.

As illustrated in FIGS. 1A, 1B, and 2B, the electronic pen main body unit 3 has a coil 31 wound around the periphery of a tubular ferrite core 32 and has a core body 34 inserted into the ferrite core 32. A tip end portion 34a of the core body 34 functions as a pen tip. A second casing (inside casing) 33 as a casing of the electronic pen main body unit 3 is coupled to a rear end side of these pen tip parts. Though not illustrated, a circuit unit including various circuit parts such as a pen pressure detecting unit for detecting a pen pressure applied to the core body 34 and a capacitor is mounted within the second casing 33. The core body 34 passes through the ferrite core 32 and is movable in an axial direction. The core body 34 presses the pen pressure detecting unit disposed within the second casing 33 according to the pen pressure applied by a user. The pen pressure detecting unit can thereby detect the pen pressure applied to the core body 34.

Further, the second casing 33 of the electronic pen main body unit 3 is provided with a side switch unit 35 including an operating element exposed from a side surface of the second casing 33 and operated by the user. The side switch unit 35 is important as one of the configurations possessed by the electronic pen to implement functions similar to a left click and a right click of what is generally called a mouse as a pointing device, for example. As illustrated in FIGS. 1A to 1C, the operating element of the side switch unit 35 is operated by the user via the opening portion 2h2 provided in the side surface of the first casing 2. In addition, a rear end portion of the second casing 33 is provided with a fitting hole 36 for mounting the electronic pen main body unit 3 within the first casing 2.

As illustrated in FIG. 2A and FIG. 2B, the dimensions of the electronic pen main body unit 3 are substantially equal to the dimensions of the refill 5 of the ballpoint pen. That is, an overall length L1 of the electronic pen main body unit 3 is equal to an overall length L1 of the refill 5 of the ballpoint pen, and a diameter R1 of the second casing 33 of the electronic pen main body unit 3 is equal to a diameter R1 of the refill 5 of the ballpoint pen. Citing a concrete example, the overall length L1 of the electronic pen main body unit is, for example, 11.2 mm, and the diameter R1 is, for example, 6 mm. It is to be noted that the concrete example cited here is a mere example and that the overall length L1 and the diameter R1 can be various values.

A state retaining mechanism unit 4 as a mechanism unit for attaching the electronic pen main body unit 3 of such a configuration to the inside of the above-described first casing 2 is provided within the first casing 2. The state retaining mechanism unit 4 includes a retaining portion 41, an inserting portion 42, a spring stop 43, and a coil spring 44. The retaining portion 41, the inserting portion 42, and the spring stop 43 are, for example, formed by a hard resin in the present embodiment and is configured not to be deformed easily.

The retaining portion 41 is formed in a cylindrical shape and is hollow on the inside. A fitting protrusion 41a is provided to an end surface on the pen tip side of the retaining portion 41. The electronic pen main body unit 3 is attached to the state retaining mechanism unit 4 as a result of the fitting protrusion 41a fitting into the fitting hole 36 present in a rear end surface of the second casing 33 of the electronic pen main body unit 3. On a side surface of the retaining portion 41, a locking protrusion 41b and a cancelling protrusion 41c protruding to the outside (first casing 2 side) are arranged side by side on a straight line in the axial direction. In the present embodiment, the locking protrusion 41b and the cancelling protrusion 41c have a same lateral width (width in a direction intersecting a direction in which these protruding portions are arranged).

In FIG. 1C, as indicated by a dotted line on the periphery of the opening portion 2h3, a rear end side of a rectangular part 41p in which the locking protrusion 41b and the cancelling protrusion 41c of the retaining portion 41 are arranged and which rear end side is opposite the pen tip side and each of a left side and a right side of the rectangular part 41p in a direction along the axial direction are notched. That is, the rectangular part 41p provided with the locking protrusion 41b and the cancelling protrusion 41c is notched along the three sides indicated by the dotted line and has a predetermined thickness. The rectangular part 41p thereby functions as what is generally called a leaf spring. Thus, as indicated by an arrow a in FIGS. 1A and 1B, the locking protrusion 41b is pushed in the direction of an inside of the retaining portion 41 when a force in a direction toward the inside is applied to the locking protrusion 41b, and the locking protrusion 41b returns to an original position when the force in the direction toward the inside is cancelled.

The inserting portion 42 is a rod-shaped part extended from the retaining portion 41 to the rear end side as the side opposite the pen tip. The inserting portion 42 has a smaller diameter than the retaining portion 41. As illustrated in FIGS. 1A and 1B, the inserting portion 42 is inserted through the coil spring 44. The spring stop 43 is a disk-shaped part provided to a rear end portion of the inserting portion 42. The spring stop 43 regulates the position of the coil spring 44 such that the coil spring 44 is not located on the rear end side of the spring stop 43. In the present embodiment, the inserting portion 42 and the spring stop 43 are formed integrally with each other. After the inserting portion 42 is inserted through the coil spring 44, the inserting portion 42 is fixed to a rear end of the retaining portion 41. The state retaining mechanism unit 4 is thereby formed.

As illustrated in FIGS. 1A and 1B, the state retaining mechanism unit 4 is attached to the inside of the first casing 2 by sandwiching the ring-shaped projecting portion 21 provided to an inner surface of the first casing 2 between a rear end surface of the retaining portion 41 and the coil spring 44 through which the inserting portion 42 is inserted. In the present embodiment, as illustrated in FIGS. 1A and 1B, the first casing 2 can be separated into two casings in the longitudinal direction and coupled together again or can be separated into two casings on the pen tip side and the rear end side and coupled together again as with the commercially available ballpoint pen. Hence, the electronic pen 1 illustrated in FIG. 1C can be formed when the first casing 2 separated in two is coupled together again after the electronic pen main body unit 3 is attached to the first casing 2.

In the thus configured electronic pen 1, when no load is applied to the coil spring 44 and the coil spring 44 has a natural length, the whole of the electronic pen main body unit 3 fitted to the retaining portion 41 is housed within the first casing 2, as illustrated in FIG. 1A. This state is a non-usage state of the electronic pen 1. In this case, the coil spring 44 locked by the projecting portion 21 acts also on the spring stop 43 to retain the whole of the electronic pen main body unit 3 fitted to the retaining portion 41 within the first casing 2 and maintains this state.

During this state, the locking protrusion 41b of the retaining portion 41 is fitted to the opening portion 2h4 of the first casing 2, and the cancelling protrusion 41c is fitted to the opening portion 2h3 of the first casing 2. Hence, no load is applied to the rectangular leaf spring part provided with the locking protrusion 41b and the cancelling protrusion 41c. In this case, no large load is applied to the coil spring 44 either. It is therefore possible to retain (maintain) a state in which the whole of the electronic pen main body unit 3 is stably housed within the first casing 2. During this state, the whole of the electronic pen main body unit 3 is located within the first casing 2, and therefore, inconvenience such as damage to the pen tip of the electronic pen main body unit 3 does not occur even when the electronic pen 1 is dropped or struck.

As illustrated in FIG. 1C, the opening portion 2h2 of the first casing 2 is to allow a sliding operation or a depressing operation of the side switch unit 35 of the electronic pen main body unit 3 attached to the state retaining mechanism unit 4 within the first casing 2. Therefore, the opening portion 2h2 has a longer length in the axial direction (longitudinal direction) than the length of the side switch unit 35 in the axial direction (longitudinal width) and has a longer length in a direction intersecting the axial direction (lateral width) than the length of the side switch unit 35 in the direction intersecting the axial direction.

As illustrated in FIG. 1A, in a case where the whole of the electronic pen main body unit 3 is housed within the first casing 2, the operating element of the side switch unit 35 of the electronic pen main body unit 3 is located on the rear end side (side opposite the pen tip) of the opening portion 2h2. In FIG. 1C, a position indicated by a dotted line within the opening portion 2h2 is the position of a rear end side of the operating element of the side switch unit 35 in the case where the whole of the electronic pen main body unit 3 is housed within the first casing 2.

Therefore, in the case where the whole of the electronic pen main body unit 3 is housed within the first casing 2, the operating element of the side switch unit 35 of the electronic pen main body unit 3 is operated to be slidingly moved to the pen tip side, as indicated by an arrow b in the vicinity of the side switch unit 35 in FIG. 1A. Consequently, as illustrated in FIGS. 1B and 1C, the electronic pen main body unit 3 within the first casing 2 slidingly moves to the pen tip side, and a pen tip portion including the tip end portion 34a of the core body 34 protrudes from the first casing 2. This state is a usage state of the electronic pen 1. Hence, the operating element of the side switch unit 35 functions as what is generally called a slide bar.

In this case, as illustrated in FIGS. 1A and 1B, the locking protrusion 41b has a configuration in which an inclination is provided on the pen tip side and an end surface orthogonal to the axial direction is formed on the side opposite the pen tip side. Therefore, the locking protrusion 41b abuts against an end portion on the pen tip side of the opening portion 2h4, is depressed inwardly as indicated by the arrow a, and moves in the direction of the pen tip. Consequently, as illustrated in FIG. 1A, the locking protrusion 41b moves to the inside of the opening portion 2h3 as illustrated in FIG. 1B from the state in which the locking protrusion 41b is fitted to the opening portion 2h4. The end surface of the locking protrusion 41b which end surface is on the side opposite the pen tip side thereby abuts against an end portion of the opening portion 2h3 which end portion is on the side opposite the pen tip side. In addition, the cancelling protrusion 41c is located within the opening portion 2h3 but is changed in position (moved) to the pen tip side.

Hence, when the coil spring 44 is in the state illustrated in FIGS. 1B and 1C, the coil spring 44 is pushed to the pen tip side by the spring stop 43. Thus, a load is applied to the coil spring 44, the spring length of the coil spring 44 is shortened, and a force with which the coil spring 44 tries to return to the original state is increased. However, the end surface on the rear end side of the locking protrusion 41b is locked by abutting against the end portion on the rear end side of the opening portion 2h3, and therefore, the position of the state retaining mechanism unit 4 within the first casing 2 is maintained. The usage state in which the pen tip of the electronic pen main body unit 3 is projected from the end portion opening portion 2h1 of the first casing 2 can thereby be maintained stably.

When the usage of the electronic pen 1 is thereafter completed and the usage state as the state illustrated in FIGS. 1B and 1C is cancelled, an operation of pressing the cancelling protrusion 41c in the direction of the axis (direction of the inside of the electronic pen 1) is performed. Consequently, the locking protrusion 41b is also depressed in the direction of the axis, and the locked state between the locking protrusion 41b and the end portion on the rear end side of the opening portion 2h3 is cancelled. Thus, a restoring force of the coil spring 44 returns the state retaining mechanism unit 4 to which the electronic pen main body unit 3 is attached to the position on the rear end side.

Consequently, the state retaining mechanism unit 4 returns to the non-usage state illustrated in FIG. 1A, and the whole of the electronic pen main body unit 3 is housed within the first casing 2. Thus, in the case of the electronic pen 1 of the present embodiment, the usage state can be set by slidingly moving the operating element of the side switch unit 35 of the electronic pen main body unit 3 to the pen tip side through the opening portion 2h2 provided in the side surface of the first casing 2. During the usage state, a side switch function in the electronic pen 1 can be used by performing a depressing operation of the operating element of the side switch unit 35.

In addition, during the usage state, the engagement of the locking protrusion 41b with the rear end portion of the opening portion 2h3 is released by performance of a depressing operation of the cancelling protrusion 41c. In this case, the restoring force of the coil spring 44 causes a transition to the non-usage state in which the whole of the electronic pen main body unit 3 is housed within the first casing 2, and the locking protrusion 41b is fitted to the opening portion 2h4. The non-usage state can therefore be maintained stably. Thus, the electronic pen 1 according to the present embodiment can be changed from the non-usage state to the usage state by slidingly moving the operating element of the side switch unit 35 provided in the side surface of the electronic pen main body unit 3 to the pen tip side through the opening portion 2h2. In addition, when a depressing operation of the cancelling protrusion 41c is performed, a change can be made from the usage state to the non-usage state due to the action of the coil spring 44.

In addition, as is also understood from the above description, the opening portion 2h2 provided in the side surface of the first casing 2 is an operating opening portion for operating the operating element of the side switch unit 35 provided in the side surface of the electronic pen main body unit 3. In addition, the opening portion 2h3 provided to the first casing 2 is a locking opening portion with which the locking protrusion 41b of the state retaining mechanism unit 4 engages to maintain the usage state and which is for operating the cancelling protrusion 41c to cancel the usage state. In addition, the opening portion 2h4 provided to the first casing 2 is a housing opening portion to which the locking protrusion 41b of the state retaining mechanism unit 4 is fitted and which is for maintaining a housed state stably when the whole of the electronic pen main body unit 3 is housed within the first casing 2.

[Example of Configuration of Side Switch Unit and Equivalent Circuit of Electronic Pen Main Body Unit]

Figure 3A:
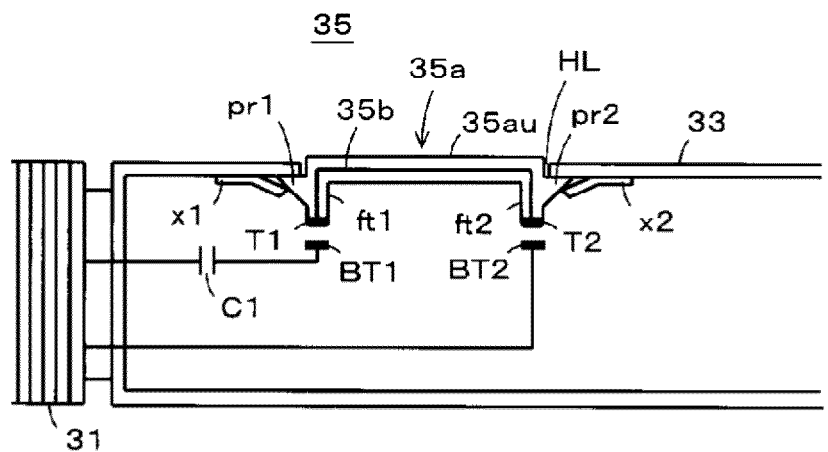
FIGS. 3A and 3B are diagrams of assistance in explaining an example of a configuration of a side switch unit disposed in the electronic pen main body unit according to the embodiment and an equivalent circuit of the electronic pen main body unit.
Figure 3B:
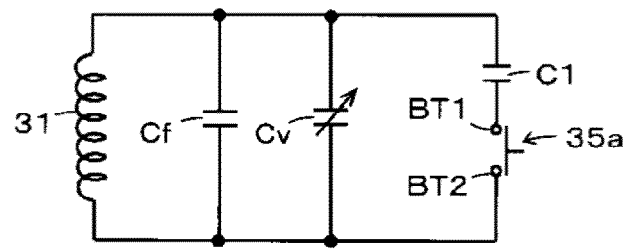

FIGS. 3A and 3B are diagrams of assistance in explaining an example of a configuration of the side switch unit 35 disposed in the electronic pen main body unit 3 (FIG. 3A) and an equivalent circuit of the electronic pen main body unit 3 including the side switch unit 35 (FIG. 3B).

An operating element 35a is, for example, formed by a synthetic resin or the like and has a certain degree of elasticity in a cured state. Therefore, the operating element 35a maintains a shape thereof in a state in which no force is applied thereto, whereas when a certain degree of force is applied to leg portions ft1 and ft2, for example, the leg portions ft1 and ft2 can be displaced in a direction of the application of the force. In addition, as illustrated in FIG. 3A, side surfaces of the two leg portions ft1 and ft2 of the operating element 35a are provided with projections pr1 and pr2 projecting outwardly.

A hole portion HL for attaching the operating element 35a is provided in an attachment position of the operating element 35a of the second casing 33. This hole portion HL is an opening portion slightly larger than a pressing portion (upper surface) 35au of the operating element 35a in both a longitudinal direction and a lateral direction. When ends of the leg portions ft1 and ft2 are inserted into the hole portion HL and the pressing portion 35au of the operating element 35a is pressed, the leg portions ft1 and ft2 are displaced inwardly, and the leg portions ft1 and ft2 including the projections pr1 and pr2 can be pushed into the hole portion HL, as illustrated in FIG. 3A.

The projections pr1 and pr2 of the leg portions ft1 and ft2 are located between the second casing 33 and biasing members x1 and x2 such as leaf springs, for example. The operating element 35a is thus attached to the second casing 33. When the pressing portion 35au of the operating element 35a attached to the second casing 33 is pressed, the operating element 35a can be pushed into the second casing 33. When the pressing of the pressing portion 35au of the operating element 35a is thereafter cancelled, the leg portions ft1 and ft2 are pushed up by the action of the biasing members x1 and x2, so that the operating element 35a returns to the original state.

Thus, the operating element 35a is attached to the second casing 33 by the biasing members x1 and x2 so as not to be detached easily. The attached operating element 35a can be pushed down in a direction intersecting the longitudinal direction of the electronic pen main body unit 3 by pressing the pressing portion 35au. In addition, when the pressing of the operating element 35a is cancelled, the operating element 35a can be pushed up by the action of the biasing members x1 and x2 and return to the original state.

Thus, in a state in which the operating element 35a is not depressed by the user, the operating element 35a remains in a predetermined position in which the projections pr1 and pr2 abut against an inner wall surface of the second casing 33, as illustrated in FIG. 3A. When the operating element 35a is depressed by the user, on the other hand, the operating element 35a is pushed down, so that contact portions T1 and T2 connected to each other by a conductor 35b can be brought into contact with terminals BT1 and BT2 of the electronic pen main body unit 3. The contact portions T1 and T2 and the terminals BT1 and BT2 are each formed by a conductor.

Thus, in the electronic pen main body unit 3 according to the present embodiment, the operating element 35a, the biasing members x1 and x2, and the terminals BT1 and BT2 of the electronic pen main body unit 3 constitute the side switch unit 35. An equivalent circuit of the electronic pen main body unit 3 according to the present embodiment having the side switch unit 35 is as illustrated in FIG. 3B.

Specifically, the electronic pen main body unit 3 according to the present embodiment has a configuration of a resonance circuit formed by connecting the coil (inductor) 31, a capacitor (capacitor) Cf, a variable capacitance capacitor Cv constituting the pen pressure detecting unit, and a frequency changing capacitor C1 in parallel with each other. In addition to this, included is a circuit unit which constitutes the side switch unit 35 for performing selection as to whether or not to connect the capacitor C1 to the resonance circuit. The circuit unit is a part including the contact portions T1 and T2 provided to the leg portions ft1 and ft2 of the operating element 35a and electrically connected to each other by the conductor 35b and the terminals BT1 and BT2 provided within the second casing 33 of the electronic pen main body unit 3.

Thus, connection/non-connection of the capacitor C1 to the resonance circuit can be selected by on/off operation of the side switch unit 35. Hence, the frequency of a signal generated by the resonance circuit can be changed between a case where the capacitor C1 is connected to the resonance circuit and a case where the capacitor C1 is not connected to the resonance circuit, and two states in the case where the capacitor C1 is not connected to the resonance circuit and the case where the capacitor C1 is connected to the resonance circuit can be notified to a position detecting device side.

Hence, a change can be made from the non-usage state to the usage state by mounting the electronic pen main body unit 3 within the first casing 2 and performing a sliding operation of the side switch unit 35 through the operating opening portion 2h2. By thus mounting the electronic pen main body unit 3 within the first casing 2, it is possible to form the electronic pen 1 and use this electronic pen. In addition, when the electronic pen 1 is in the usage state, the usage state of the side switch unit 35 (two on and off values) can be notified to the position detecting device by performing a depressing operation of the operating element 35a of the side switch unit 35.

[Another Example of Configuration of Side Switch Unit and Equivalent Circuit of Electronic Pen Main Body Unit]

Figure 4A:
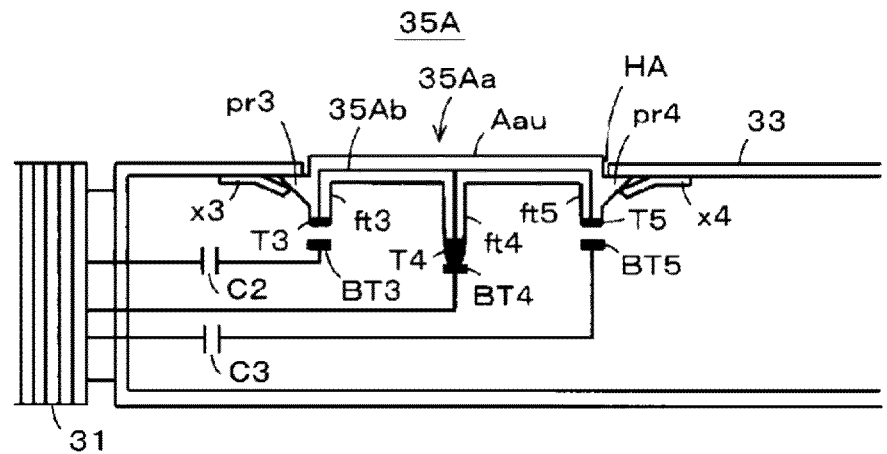
FIGS. 4A and 4B are diagrams of assistance in explaining another example of configuration of the side switch unit provided to the electronic pen main body unit and an equivalent circuit of the electronic pen main body unit according to the embodiment.
Figure 4B:
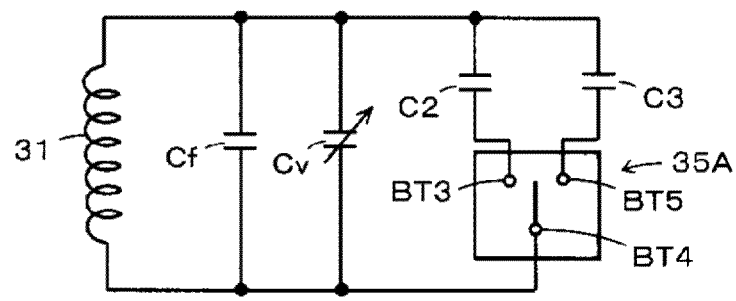

FIGS. 4A and 4B are diagrams of assistance in explaining a side switch unit 35A (FIG. 4A) as another example of configuration of the side switch unit 35 provided to the electronic pen main body unit 3 and an equivalent circuit (FIG. 4B) of an electronic pen main body unit 3A including the side switch unit 35A. Incidentally, parts of the electronic pen main body unit 3A in the present example other than the side switch unit 35A are formed in a similar manner to those of the electronic pen main body unit 3 described with reference to FIGS. 1A to 1C, 2A, and 2B, including external appearances and sizes of the other parts. Therefore, in FIGS. 4A and 4B, the parts formed in a similar manner to those in the case of the above-described electronic pen main body unit 3 are identified by the same reference numerals, and description of the parts will be omitted.

An operating element 35Aa includes three leg portions ft3, ft4, and ft5. End portions of the three leg portions ft3, ft4, and ft5 are provided with contact portions T3, T4, and T5 formed by a conductor. These contact portions are connected to each other by a conductor 35Ab. The operating element 35Aa is also formed by a synthetic resin or the like and has a certain degree of elasticity in a cured state. Therefore, the operating element 35Aa maintains a shape thereof in a state in which no force is applied thereto, whereas when a certain degree of force is applied to the leg portions ft3 and ft5, for example, the leg portions ft3 and ft5 can be displaced in a direction of the application of the force.

In addition, side surfaces of the leg portions ft3 and ft5 of the operating element 35Aa are provided with projections pr3 and pr4 projecting outward. A hole portion HA for attaching the operating element 35Aa is provided in an attachment position of the operating element 35Aa of the second casing 33. This hole portion HA has an opening portion slightly larger than a pressing portion Aau of the operating element 35Aa in both a longitudinal direction and a lateral direction. Therefore, the leg portions ft3, ft4, and ft5 of the operating element 35Aa are pressed so as to be inserted into the hole portion HA and are pushed into the hole portion HA while the leg portions ft3 and ft5 are displaced inwardly. Consequently, the projections pr3 and pr4 of the leg portions ft3 and ft5 are pushed into the second casing 33 and positioned between the second casing 33 and biasing members x3 and x4, and the leg portions ft3 and ft5 displaced inward return to the original state. The operating element 35Aa can thus be attached to the second casing 33 so as not to be detached easily.

As illustrated in FIG. 4A, the biasing members x3 and x4 such as leaf springs, for example, provided to the left and right of the hole portion HA of the second casing 33 abut against the projections pr3 and pr4 and act to push up the operating element 35Aa to the outside of the second casing 33, or, in FIG. 4A, to an upper side of the figure. Thus, in a state in which the operating element 35Aa is not depressed by the user, the operating element 35Aa remains in a predetermined position in which the projections pr3 and pr4 abut against the inner wall surface of the second casing 33, as illustrated in FIG. 4A.

The operating element 35Aa can be operated in what is generally called a seesaw manner by performing depressing operations of the pressing portion Aau of the operating element 35Aa. Thus, when the contact portions T3 and T4 of the operating element 35Aa are brought into contact with the terminals BT3 and BT4 of the electronic pen main body unit 3A, the terminal BT3 and the terminal BT4 can be electrically connected to each other. Conversely, when the contact portions T4 and T5 of the operating element 35Aa are brought into contact with the terminals BT4 and BT5 of the electronic pen main body unit 3A, the terminal BT4 and the terminal BT5 can be electrically connected to each other.

When the terminal BT3 and the terminal BT4 are connected to each other, a frequency changing capacitor C2 is connected to the resonance circuit. When the terminal BT4 and the terminal BT5 are connected to each other, a frequency changing capacitor C3 is connected to the resonance circuit. It is thereby possible to form a state in which the capacitor C2 is connected in parallel with the resonance circuit including the electronic pen main body unit 3A, a state in which the capacitor C3 is connected in parallel with the resonance circuit, and a state in which none of the capacitor C2 and the capacitor C3 is connected to the resonance circuit.

Thus, in the electronic pen main body unit 3A in the present example, the operating element 35Aa, the biasing members x3 and x4, and the terminals BT3, BT4, and BT5 of the electronic pen main body unit 3A constitute the side switch unit 35A. An equivalent circuit of the electronic pen main body unit 3A in the present example having the side switch unit 35A is as illustrated in FIG. 4B.

The electronic pen main body unit 3A in the present example has a configuration formed by connecting the coil (inductor) 31, a capacitor (capacitor) Cf, a variable capacitance capacitor Cv constituting the pen pressure detecting unit, and the frequency changing capacitors C2 and C3 in parallel with each other. In addition, the operating element 35Aa and the terminals BT3, BT4, and BT5 provided within the second casing 33 of the electronic pen main body unit 3A constitute a side switch.

When the operating element 35Aa is not operated, a state in which none of the terminals BT3, BT4, and BT5 of the electronic pen main body unit 3A is electrically connected can be set. In addition, by operating the operating element 35Aa, it is possible to switch between a case where the capacitor C2 is connected in parallel with the resonance circuit and a case where the capacitor C3 is connected in parallel with the resonance circuit. Hence, the frequency of a signal generated by the resonance circuit can be changed between the case where none of the capacitors C2 and C3 is connected to the resonance circuit, the case where the capacitor C2 is connected to the resonance circuit, and the case where the capacitor C3 is connected to the resonance circuit, and these three states can be notified to the position detecting device.

Also in the case of the electronic pen main body unit 3A in the present example, as in the electronic pen main body unit 3 described above, a change can be made from the non-usage state to the usage state by mounting the electronic pen main body unit 3A within the first casing 2 and performing a sliding operation of the side switch unit 35A through the operating opening portion 2h2. By thus mounting the electronic pen main body unit 3A within the first casing 2, it is possible to form an electronic pen 1A and use this electronic pen 1A as an electronic pen. In addition, when the electronic pen 1A is in the usage state, the usage state of the side switch unit 35A (three values of an off state, an on state of the capacitor C2, and an on state of the capacitor C3) can be notified to the position detecting device by performing a depressing operation of the operating element 35Aa of the side switch unit 35A.

[Example of Configuration of Operating Element of Side Switch Unit]

Figure 5A:
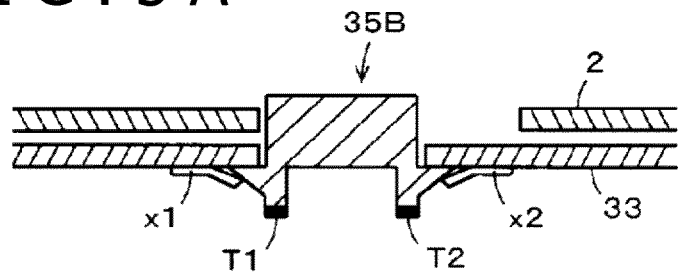
FIGS. 5A and 5B are diagrams of assistance in explaining other examples of an operating element of the side switch unit provided to the electronic pen main body unit according to the embodiment.
Figure 5B:
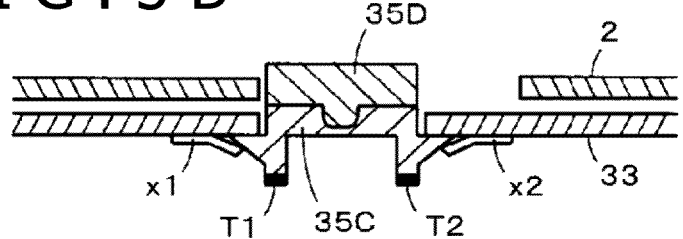

The side switch unit 35 or 35A has the operating element 35a or 35Aa provided in the side surface of the second casing 33 of the electronic pen main body unit 3 or 3A. Therefore, for ease of operation through the operating opening portion 2h2 of the first casing 2, the operating element 35a or 35Aa is desired to protrude to the first casing 2 side. FIGS. 5A and 5B are diagrams of assistance in explaining examples of configuration of the operating element of the side switch unit provided to the electronic pen main body unit according to the embodiment.

In the case where the first casing 2 can be separated into two casings in the longitudinal direction as illustrated in FIGS. 1A and 1B and coupled together again, the operating element 35a or 35Aa does not become an obstacle in mounting the electronic pen main body unit 3 or 3A to the first casing 2 even when the operating element 35a or 35Aa protrudes to the first casing 2 side. Therefore, as illustrated in FIG. 5A, an operating element 35B protruding to the first casing 2 side can be formed, and this operating element can be used.

However, in the case where the first casing 2 can be separated into two casings on the pen tip side and the rear end side and coupled together again as with the commercially available ballpoint pen, the operating element 35a or 35Aa becomes an obstacle in mounting the electronic pen main body unit 3 or 3A to the first casing 2 when the operating element 35a or 35Aa protrudes to the first casing 2 side. Accordingly, as illustrated in FIG. 5B, an operating element 35C is formed so as not to protrude to the first casing 2 side. However, a recessed portion is provided to the upper surface of the operating element 35C.

After the electronic pen main body unit including the operating element 35C is mounted in the first casing 2, a retrofitting operating element 35D is attached from the operating opening portion 2h2 such that a protruding portion provided to a bottom surface of the retrofitting operating element 35D is fitted into the recessed portion of the operating element 35C. Thus, as illustrated in FIG. 5B, the operating element 35C integral with the operating element 35D can be operated through the operating element 35D that protrudes to the first casing 2 side so as to be easily operated from the operating opening portion 2h2.

Incidentally, the above description has been made of a case where a side switch unit is formed using an operating element including two leg portions as in the side switch unit 35 having the configuration illustrated in FIG. 3A. However, there is no limitation to this. A similar configuration can be made also in the case where the side switch unit is formed using the operating element including the three leg portions of the configuration illustrated in FIG. 4A.

[Electronic Pen Using Knock Type First Casing]

Figures 6A, 6B:
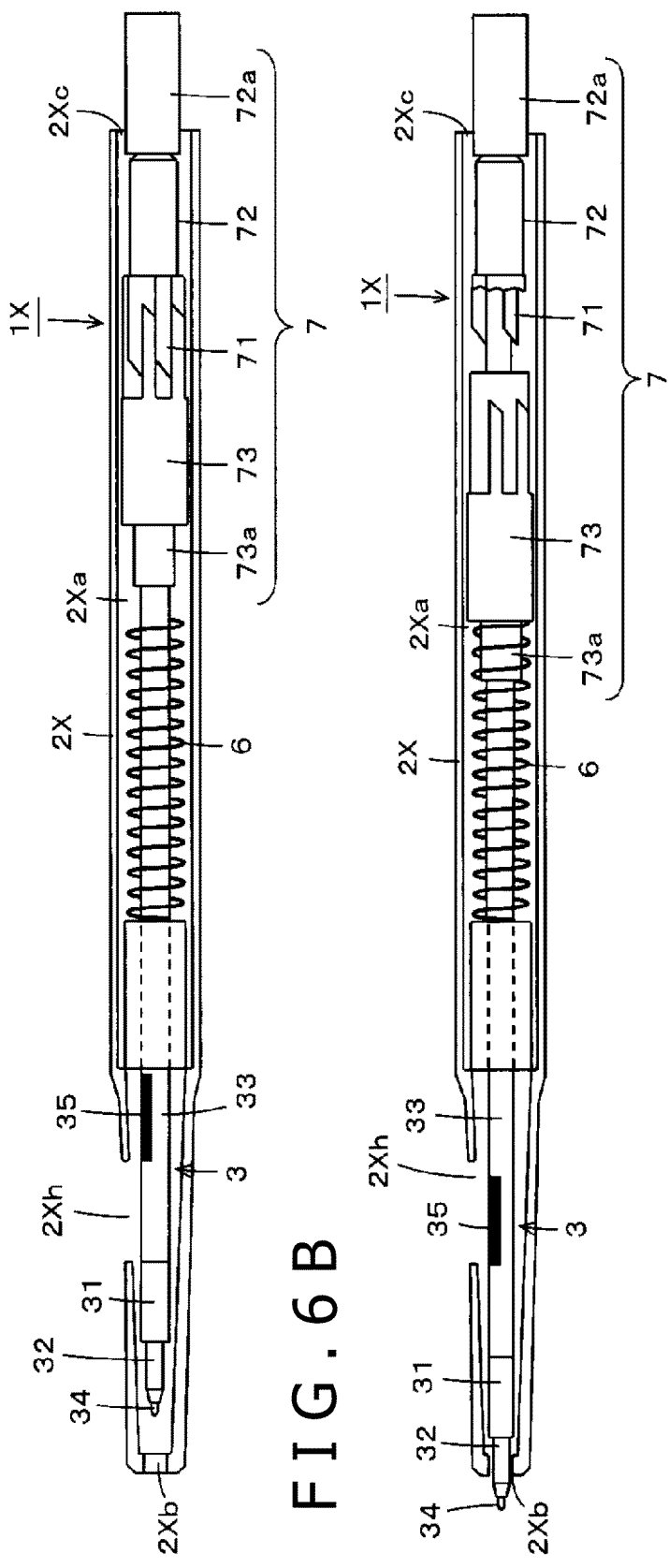
FIGS. 6A and 6B are diagrams of assistance in explaining another example of a configuration of the electronic pen according to the embodiment.

FIGS. 6A and 6B are diagrams of assistance in explaining another example of configuration of the electronic pen according to the embodiment. As in the case of the electronic pen 1 according to the foregoing embodiment, an electronic pen 1X in the present example is used in a state in which the electronic pen main body unit 3 (FIGS. 3A and 3B) or 3A (FIGS. 4A and 4B) is mounted in a first casing 2X. However, the first casing 2X in the present example is of what is generally called a knock type switched between the usage state and the non-usage state by performing a knock operation of a rear end portion as in the case of many commercially available ballpoint pens.

The electronic pen 1X illustrated in FIGS. 6A and 6B has a knock type configuration in which the electronic pen main body unit 3 is housed within a hollow portion 2Xa of the first casing 2X and a knock cam mechanism unit 7 moves the pen tip side of the electronic pen main body unit 3 in and out from an opening 2Xb side at one end in the longitudinal direction of the first casing 2X. In the present example, the electronic pen main body unit 3 has the configuration described with reference to FIGS. 1 to 3. However, the electronic pen main body unit 3 can be formed with the overall length L1 and the diameter R1 adjusted as appropriate according to the size of the first casing 2X.

FIG. 6A illustrates a state in which the whole of the electronic pen main body unit 3 is housed within the hollow portion 2Xa of the first casing 2X. FIG. 6B illustrates a state in which the knock cam mechanism unit 7 protrudes the pen tip side of the electronic pen main body unit 3 from the opening 2Xb of the first casing 2X. Incidentally, the example of FIGS. 6A and 6B is represented as a case where the first casing 2X of the electronic pen 1X is sectioned in half in the longitudinal direction and one half is removed to make the inside of the first casing 2X visible. The electronic pen 1X in the present example is of a configuration compatible with the commercially available knock type ballpoint pen.

The first casing 2X and the knock cam mechanism unit 7 provided within the first casing 2X are of the same configuration as the well-known commercially available knock type ballpoint pen and also have dimensional relation thereof configured to be the same as the well-known commercially available knock type ballpoint pen. In other words, a casing and a knock cam mechanism unit of a commercially available knock type ballpoint pen can be used as the first casing 2X and the knock cam mechanism unit 7, as they are. However, a side surface of the first casing 2X is provided with an operating opening portion 2Xh, as illustrated in FIGS. 6A and 6B.

As illustrated in FIGS. 6A and 6B, the knock cam mechanism unit 7 has a well-known configuration in which a cam main body 71, a knock bar 72, and a rotator 73 are combined with each other. The cam main body 71 is formed on an inner wall surface of the first casing 2X in a tubular shape. The knock bar 72 has an end portion 72a projecting from an opening 2Xc on the side opposite the pen tip side of the first casing 2X to be able to receive a knock operation of a user. The rotator 73 has a fitting portion 73a fitted with an end portion on the side opposite the pen tip side of the electronic pen main body unit 3.

When the end portion 72a of the knock bar 72 is depressed in a state of FIG. 6A, the knock cam mechanism unit 7 locks the electronic pen main body unit 3 in a state of FIG. 6B within the first casing 2X. The pen tip side of the electronic pen main body unit 3 consequently protrudes from the opening 2Xb of the first casing 2X. When the end portion 72a of the knock bar 72 is depressed again from the state of FIG. 6B, the knock cam mechanism unit 7 cancels the locked state, and a return spring 6 causes the position of the electronic pen main body unit 3 within the first casing 2X to return to the state of FIG. 6A. A detailed configuration of the knock cam mechanism unit 7 and operation thereof are well known, and therefore, description thereof will be omitted here.

As illustrated in FIG. 6A, when the whole of the electronic pen main body unit 3 is housed within the first casing 2X (non-usage state), the side switch unit 35 provided to the electronic pen main body unit 3 is not exposed from the operating opening portion 2Xh of the first casing 2X. That is, during the non-usage state illustrated in FIG. 6A, the side switch unit 35 is not operable. On the other hand, as illustrated in FIG. 6B, when the pen tip side of the electronic pen main body unit 3 protrudes from the opening 2Xb of the first casing 2X (usage state), the side switch unit 35 provided to the electronic pen main body unit 3 is exposed from the operating opening portion 2Xh of the first casing 2X. That is, during the usage state illustrated in FIG. 6B, the side switch unit 35 is operable.

Thus, the present disclosure is applicable also to the case where the electronic pen 1X is formed using the first casing 2X including the knock cam mechanism unit 7. In the case of the example illustrated in FIGS. 6A and 6B, the side switch unit 35 is operable during the usage state (FIG. 6B) but is not usable during the non-usage state (FIG. 6A). Hence, there is an advantage in that the electronic pen 1X can function as the electronic pen and the side switch unit 35 can be operated only when the side switch unit 35 needs to be operated.

[Application to Capacitance Type Electronic Pen]

In the foregoing embodiment, description has been made by taking as an example a case where the present disclosure is applied to an electromagnetic induction type electronic pen. However, the present disclosure is also applicable to a capacitance type electronic pen. Specifically, as a configuration in external appearance, the operating opening portion 2h2 or 2Xh is provided to the first casing 2 or 2X. The side switch unit 35 or 35A is provided in a side surface of a second casing of a capacitance type electronic pen main body unit 3B mounted in the first casing. It suffices to allow a depressing operation of the side switch unit 35 or 35A through the operating opening portion 2h2 or 2Xh when the capacitance type electronic pen main body unit 3B is mounted in the first casing 2 or 2X and set in the usage state.

Figure 7:
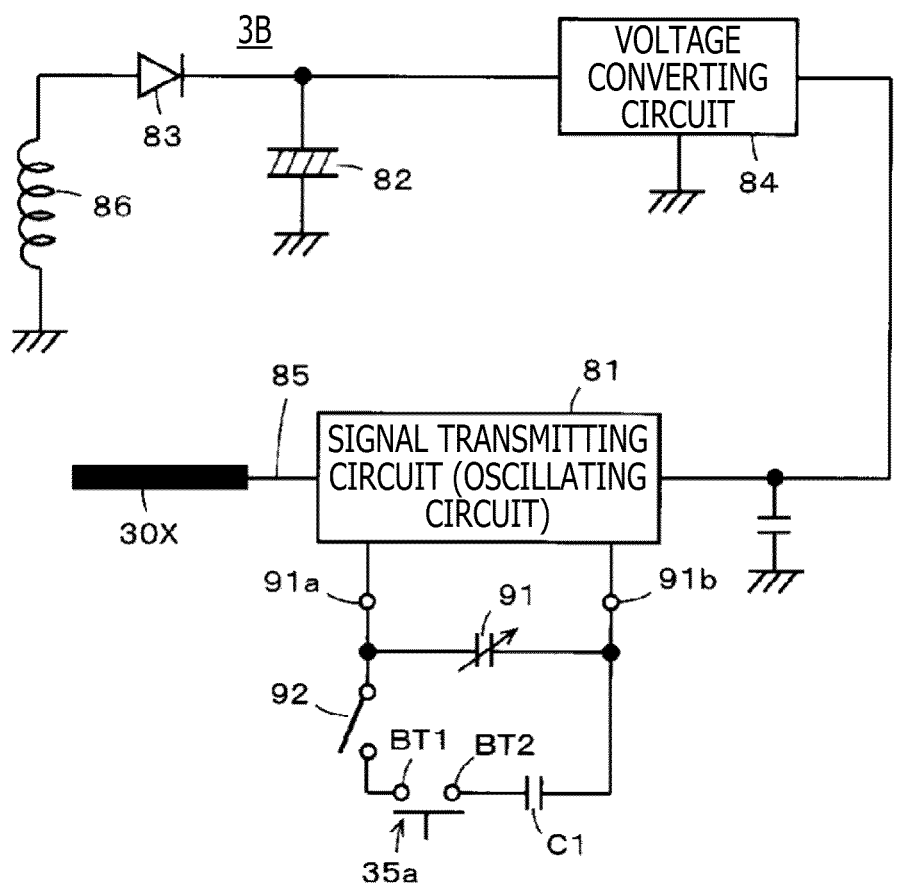
FIG. 7 is a diagram illustrating an equivalent circuit of a capacitance type electronic pen main body unit according to the embodiment to which the present disclosure is applied.

FIG. 7 is a diagram illustrating an equivalent circuit of the electronic pen main body unit 3B having functions of an active capacitive pen as an example of a capacitance type electronic pen. Incidentally, the active capacitive pen illustrated in FIG. 7 performs charging by electromagnetic induction and has a coil 86 for this purpose. In the electronic pen main body unit 3B, a core body 30X has a configuration of an electrode core formed of a conductor, for example, a conductive metal or a hard resin in which conductive powder is mixed. In the following description, the core body 30X will be referred to as an electrode core 30X. In the present example, as illustrated in FIG. 7, an electronic circuit formed on a printed circuit board has a circuit configuration including a signal transmitting circuit 81, an electric double layer capacitor 82 as an example of a storage element generating a driving voltage (power supply voltage) for driving the signal transmitting circuit 81, a rectifying diode 83, and a voltage converting circuit 84. The signal transmitting circuit 81 in the present example is formed by an oscillating circuit.

As in the case of the electronic pen main body unit 3 according to the foregoing embodiment, the electrode core 30X is inserted through a through hole of a ferrite core, is fitted to a pressing member (pressure transmitting member) of a pen pressure detecting module, and transmits a pen pressure to a pressure sensing unit via the pressing member. The electrode core 30X is electrically connected to the signal transmitting circuit 81 on the printed board by a connection line 85.

As illustrated in FIG. 7, two terminal members 91a and 91b of the pen pressure detecting module are electrically connected to the signal transmitting circuit 81 formed on the printed board. The oscillating circuit constituting the signal transmitting circuit 81 generates a signal changing in frequency according to the capacitance of a variable capacitance capacitor 91 of the pressure sensing unit of the pen pressure detecting module and supplies the generated signal to the electrode core 30X.

Further, a capacitor C1 and a side switch unit 35 are connected in parallel with the signal transmitting circuit 81. The side switch unit 35 is of the configuration described with reference to FIG. 3A. Thus, the frequency of the signal generated from the signal transmitting circuit 81 can be changed by selecting connection/non-connection of the capacitor C1 to the signal transmitting circuit 81 according to turning on/off of the side switch unit 35.

When the electronic pen main body unit 3B in the present example in a state of being mounted in the first casing 2 or 2X is mounted on an unillustrated charger, an alternating magnetic field generated by the charger causes an induced electromotive force in the coil 86, so that the electric double layer capacitor 82 is charged via a diode 83. As also described above, the coil 86 is for charging. The voltage converting circuit 84 converts a voltage stored in the electric double layer capacitor 82 into a fixed voltage and supplies the fixed voltage as power to the signal transmitting circuit 81.

When the electronic pen main body unit 3B performs normal operation (when the electronic pen main body unit 3B does not perform charging operation), the coil 86 is at fixed potential (ground potential (GND) in the present example) and therefore acts as a shield electrode provided on the periphery of the electrode core 30X. Incidentally, the fixed potential of the coil 86 when the electronic pen main body unit 3B performs the normal operation is not limited to the ground potential and may be a positive side potential of the power supply or may be a potential intermediate between the positive side potential of the power supply and the ground potential.

The signal transmitting circuit (oscillating circuit) 81 generates the signal changing in frequency according to the capacitance of the variable capacitance capacitor 91 formed by the pressure sensing unit of the pen pressure detecting module and the capacitance of the capacitor C1 when the capacitor C1 is connected to the signal transmitting circuit 81 by the side switch unit 35, and supplies the generated signal to the electrode core 30X. The signal from the signal transmitting circuit 81 is emitted as an electric field based on the signal from the electrode core 30X. A position detecting device that detects a position (coordinate position) indicated by the electronic pen main body unit 3B in the present example can obtain a pen pressure applied to the electrode core 30X and the on/off state of the side switch from the frequency of the signal.

Incidentally, a switch 92 is "on" when the pen tip of the electronic pen main body unit 3B in the present example protrudes from the end portion opening portion 2h1 or 2Xb of the first casing 2 or 2X and the usage state is thus set as illustrated in FIGS. 1B, 1C, and 6B. The switch 92 is "off" during the non-usage state. Thus, a pressing operation of the side switch unit 35 or 35A is valid only during the usage state.

It is thus possible to form a capacitance type electronic pen having a configuration corresponding to the equivalent circuit shown in FIG. 7 and having a configuration similar in external appearance to that illustrated in FIGS. 1A to 1C or 6A and 6B. In this case, as in the commercially available ballpoint pen, the usage state and the non-usage state can be selected and used, and the side switch unit 35 or 35A provided in the side surface of the electronic pen main body unit 3B can be operated through the operating opening portion 2h2 or 2Xh of the first casing 2 or 2X.

Effects of Embodiment

According to the electronic pen in accordance with the foregoing embodiment, the thinned electronic pen main body unit 3, 3A, or 3B can be used in a state of being mounted within the first casing 2 or 2X. In this case, it is possible to use the electronic pen by switching between the usage state in which the pen tip portion of the electronic pen main body unit 3, 3A, or 3B protrudes from the front end of the first casing 2 or 2X and the non-usage state in which the whole of the electronic pen main body unit 3, 3A, or 3B is housed within the first casing 2 or 2X. That is, the electronic pen can be used in a usage mode similar to that of the commercially available ballpoint pen that allows replacement of the refill. In addition, the electronic pen is convenient to carry about.

Further, the side switch unit 35 or 35A provided to the electronic pen main body unit 3, 3A, or 3B can be operated directly through the operating opening portion 2h2 or 2Xh provided to the side surface of the first casing 2 or 2X. It is thereby possible to operate the side switch unit appropriately and surely and make the side switch function operate stably at all times.

[Modifications]

Figure 8A:
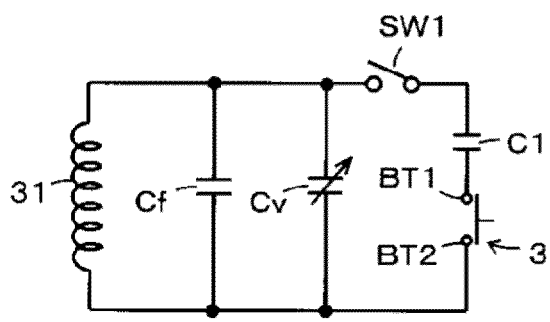
FIGS. 8A and 8B are diagrams illustrating equivalent circuits of modifications of the electronic pen main body unit according to the embodiment.
Figure 8B:
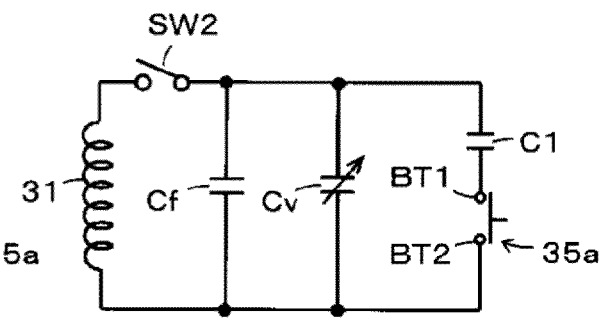

FIGS. 8A and 8B are diagrams illustrating equivalent circuits of modifications of the electronic pen main body unit 3. As illustrated in FIG. 8A, the electronic pen main body unit 3 is provided with a switch SW1 that is on during the usage state and is off during the non-usage state. The side switch function can thereby be made to function only when the electronic pen 1 is in the usage state.

In addition, as illustrated in FIG. 8B, the electronic pen main body unit 3 is provided with a switch SW2 that is on during the usage state and is off during the non-usage state. The electronic pen functions including the side switch function as well can thereby be made to function only when the electronic pen 1 is in the usage state.

Thus, on/off control of the state in which the side switch function is made to function and on/off control of the state in which the electronic pen functions are made to function can be performed according to a position at which a switch such as the switch SW1 or SW2 is provided. Incidentally, as for the switch SW1 or SW2, it suffices to provide the switch SW1 or SW2 to the electronic pen main body unit 3 and provide the inner wall surface of the first casing with a projection that presses the switch SW1 or SW2 and sets the switch SW1 or SW2 in an on state when the usage state is set. The switch SW1 or SW2 may of course be implemented by a configuration other than this. In addition, configurations similar to those illustrated in FIGS. 8A and 8B are also applicable to the electronic pen main body unit 3A of the configuration illustrated in FIG. 4B.

In addition, the size of the electronic pen main body unit 3, 3A, or 3B and the size of the first casing 2 or 2X are not limited to those of the foregoing embodiment and can be realized as various sizes.

In addition, the configurations of the side switch units are not limited to those described with reference to FIGS. 3A, 3B, 4A, and 4B and can be various configurations that can be at least turned on/off.

It is to be noted that the embodiments of the present disclosure are not limited to the foregoing embodiment, and that various changes can be made without departing from the spirit of the present disclosure.

What is claimed is:

1. An electronic pen comprising:
a first casing;
a second casing disposed within the first casing; and
an electronic pen main body unit incorporating an electronic pen function disposed within the second casing, wherein the electronic pen main body unit includes a side switch unit having a side switch knob exposed on a side surface of the second casing,
wherein:
an operating opening portion is disposed in a side surface of the first casing, and the operating opening portion exposes to an outside of the electronic pen the side switch knob of the side switch unit of the electronic pen main body unit exposed on the side surface of the second casing,
a length of the operating opening portion in a longitudinal direction of the first casing is greater than a length of the side switch knob of the side switch unit of the electronic pen main body unit in the longitudinal direction of the first casing,
the side switch knob of the side switch unit of the electronic pen main body unit is slidingly movable in the longitudinal direction of the first casing between a first position and a second position within the operating opening portion,
when the side switch knob of the electronic pen main body unit is at the first position in the longitudinal direction of the first casing, a pen tip of the electronic pen main body unit protrudes from a front end of the first casing,
when the side switch knob of the electronic pen main body unit is at the second position in the longitudinal direction of the first casing, the pen tip of the electronic pen main body unit does not protrude from the front end of the first casing, and
the side switch knob of the electronic pen main body unit is exposed through the operating opening portion to the outside of the electronic pen when the side switch knob of the electronic pen main body unit is at both the first position and the second position.

2. The electronic pen according to claim 1, wherein:
the pen tip of the electronic pen main body unit protrudes from the front end of the first casing when the side switch knob of electronic pen main body unit is slidingly moved towards the front end of the first casing to the first position in the longitudinal direction of the first casing, and
the pen tip of the electronic pen main body unit does not protrude from the front end of the first casing when the side switch knob of electronic pen main body unit is slidingly moved away from the front end of the first casing to the second position in the longitudinal direction of the first casing.

3. The electronic pen according to claim 2, further comprising:
a state retaining mechanism that retains a state in which the pen tip of the electronic pen main body unit protrudes from the front end of the first casing,
wherein the state retaining mechanism slidingly moves the electronic pen main body unit in a direction of a rear end of the first casing that is opposite a pen tip side of the first casing to house the pen tip within the first casing when a cancelling operation that cancels the state in which the pen tip protrudes from the front end of the first casing is performed.

4. The electronic pen according to claim 3, wherein:
the state retaining mechanism includes:
an elastic member that biases the electronic pen main body unit in the direction of the rear end of the electronic pen main body unit when the pen tip protrudes from the front end of the first casing, and
a locking protruding portion disposed on the second casing and acting to maintain a biased state of the elastic member by engagement with a locking opening portion disposed in the first casing, and
the cancelling operation is an operation of cancelling the engagement of the locking protruding portion with the locking opening portion.

5. The electronic pen according to claim 2, wherein:
a core body including the pen tip is disposed on a pen tip side of the electronic pen main body unit, and a ferrite core is disposed on a periphery of a side surface of the core body.

6. The electronic pen according to claim 1, wherein:
the side switch knob is configured to protrude from the side surface of the second casing.

7. The electronic pen according to claim 1, further comprising:
a knock mechanism that enables a transition to a state in which all of the electronic pen main body unit is housed within the first casing and a state in which a pen tip of the electronic pen main body unit protrudes outside of the first casing,
wherein the side switch knob becomes operable through the operating opening portion of the first casing when the pen tip of the electronic pen main body unit protrudes outside of the first casing.

8. The electronic pen according to claim 1, wherein:
the electronic pen main body unit includes a resonance circuit including an inductor and a capacitor in the second casing.

9. The electronic pen according to claim 8, wherein:
the electronic pen main body unit includes a capacitor that changes a frequency of an oscillated signal and that is disposed so as to be connectable to the resonance circuit, and
the capacitor is selectively connected to the resonance circuit according to an operation of the side switch knob.

10. The electronic pen according to claim 1, wherein:
the electronic pen main body unit includes a transmitting circuit.

11. The electronic pen according to claim 10, wherein:
the electronic pen main body unit includes a capacitor that changes a frequency of an output signal and that is disposed so as to be connectable to the transmitting circuit, and
the capacitor is selectively connected to the transmitting circuit according to an operation of the side switch knob.

12. The electronic pen according to claim 1, wherein:
the electronic pen main body unit includes a signal transmitting circuit which, in operation, generates a signal based on a pressure applied to the pen tip of the electronic pen main body unit,
wherein, when the side switch knob of the electronic pen main body unit is at the first position in the longitudinal direction of the first casing, the side switch knob of the electronic pen main body unit is electrically coupled to signal transmitting circuit, and
wherein, when the side switch knob of the electronic pen main body unit at the second position in the longitudinal direction of the first casing, the side switch knob of the electronic pen main body unit is not electrically coupled to signal transmitting circuit.

13. The electronic pen according to claim 1, wherein:
the electronic pen main body unit includes:
a coil; and
a pen pressure detector having an electrical characteristic which, in operation, varies based a pressure applied to the pen tip of the electronic pen main body unit,
when the side switch knob of the electronic pen main body unit is at the first position in the longitudinal direction of the first casing, the pen pressure detector is electrically coupled to the coil, and
when the side switch knob of the electronic pen main body unit is at the second position in the longitudinal direction of the first casing, the pen pressure detector is not electrically coupled to the coil.

14. The electronic pen according to claim 1, wherein:
the electronic pen main body unit includes a coil,
when the side switch knob of the electronic pen main body unit is at the first position in the longitudinal direction of the first casing, the side switch knob is electrically coupled to the coil, and
when the side switch knob of the electronic pen main body unit is at the second position in the longitudinal direction of the first casing, the side switch knob is not electrically coupled to the coil.

15. An electronic pen main body unit that performs an electronic pen function of an electronic pen that includes a first casing, the electronic pen main body unit comprising:
a second casing configured to be disposed within the first casing; and
a side switch unit having a side switch knob exposed on a side surface of the second casing and operable from an operating opening portion disposed in a side surface of the first casing,
wherein:
the side switch knob of the side switch unit exposed on the side surface of the second casing is configured to be exposed to an outside of the electronic pen by the operating opening portion of the first casing,
a length of the operating opening portion in a longitudinal direction of the first casing is greater than a length of the side switch knob of the side switch unit of the electronic pen main body unit in the longitudinal direction of the first casing,
the side switch knob of the side switch unit of the electronic pen main body unit is slidingly movable in the longitudinal direction of the first casing between a first position and a second position within the operating opening portion, when the side switch knob of the electronic pen main body unit is at the first position in the longitudinal direction of the first casing, a pen tip of the electronic pen main body unit protrudes from a front end of the first casing, when the side switch knob of the electronic pen main body unit is at the second position in the longitudinal direction of the first casing, the pen tip of the electronic pen main body unit does not protrude from the front end of the first casing, and the side switch knob of the electronic pen main body unit is exposed through the operating opening portion to the outside of the electronic pen when the side switch knob of the electronic pen main body unit is at both the first position and the second position.

16. The electronic pen main body unit claim 15, further comprising:

a signal transmitting circuit which, in operation, generates a signal based on a pressure applied to the pen tip of the electronic pen main body unit, wherein, when the side switch knob of the electronic pen main body unit is at the first position in the longitudinal direction of the first casing, the side switch knob of the electronic pen main body unit is electrically coupled to signal transmitting circuit, and wherein, when the side switch knob of the electronic pen main body unit at the second position in the longitudinal direction of the first casing, the side switch knob of the electronic pen main body unit is not electrically coupled to signal transmitting circuit.

17. The electronic pen main body unit claim 15, further comprising:

a coil; and a pen pressure detector having an electrical characteristic which, in operation, varies based a pressure applied to the pen tip of the electronic pen main body unit, wherein:

when the side switch knob is at the first position in the longitudinal direction of the first casing, the pen pressure detector is electrically coupled to the coil, and when the side switch knob is at the second position in the longitudinal direction of the first casing, the pen pressure detector is not electrically coupled to the coil.

18. The electronic pen main body unit claim 15, further comprising:

a coil, wherein:

when the side switch knob is at the first position in the longitudinal direction of the first casing, the side switch knob is electrically coupled to the coil, and when the side switch knob is at the second position in the longitudinal direction of the first casing, the side switch knob is not electrically coupled to the coil.

* * * * *